Jan. 26, 1971     J. C. POWELL ET AL     3,557,435
METHOD FOR REPAIRING BUNGHOLES
Filed Sept. 25, 1968     3 Sheets-Sheet 3
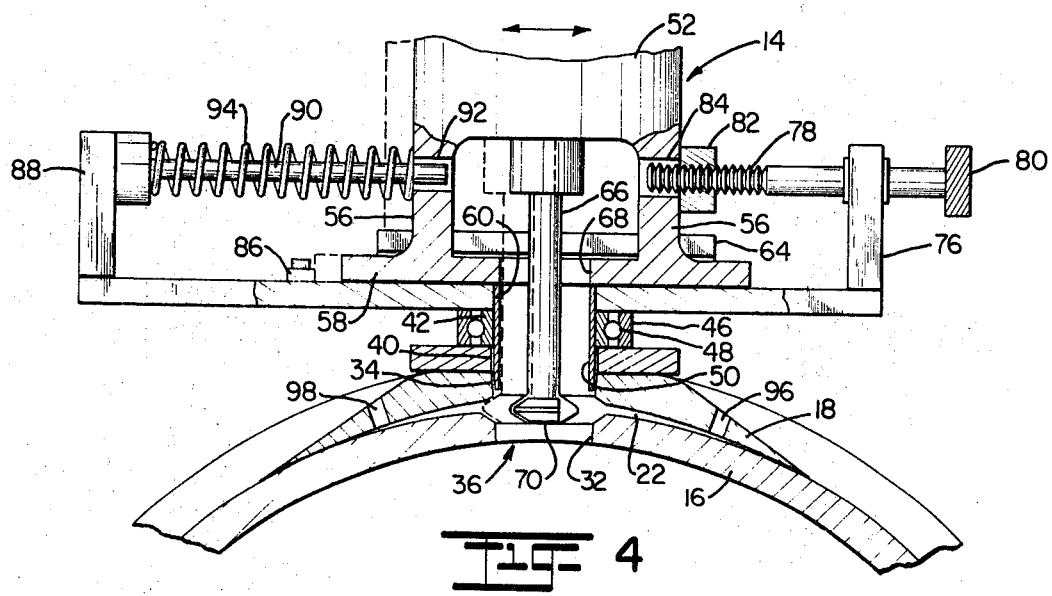
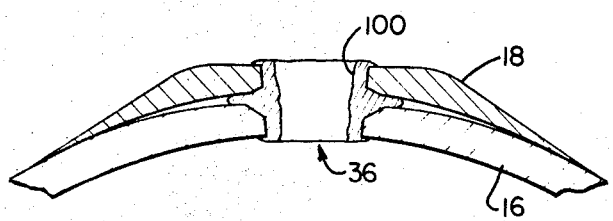
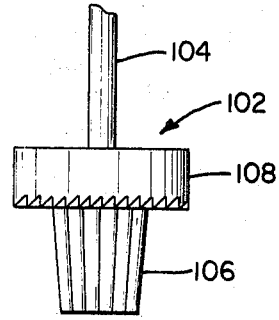
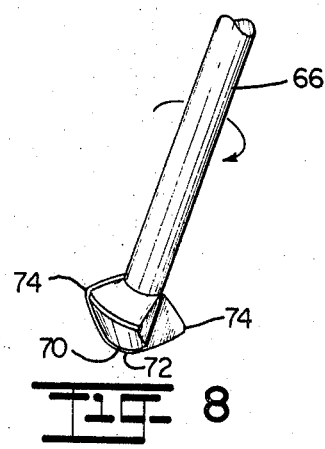
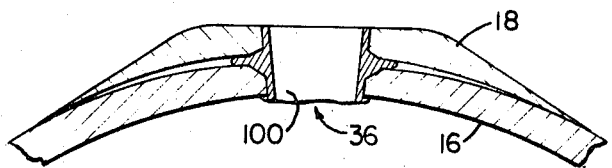
INVENTOR.
JERALD C. POWELL
RAY E. STRINGER
BY
Sheridan and Ross
ATTORNEYS

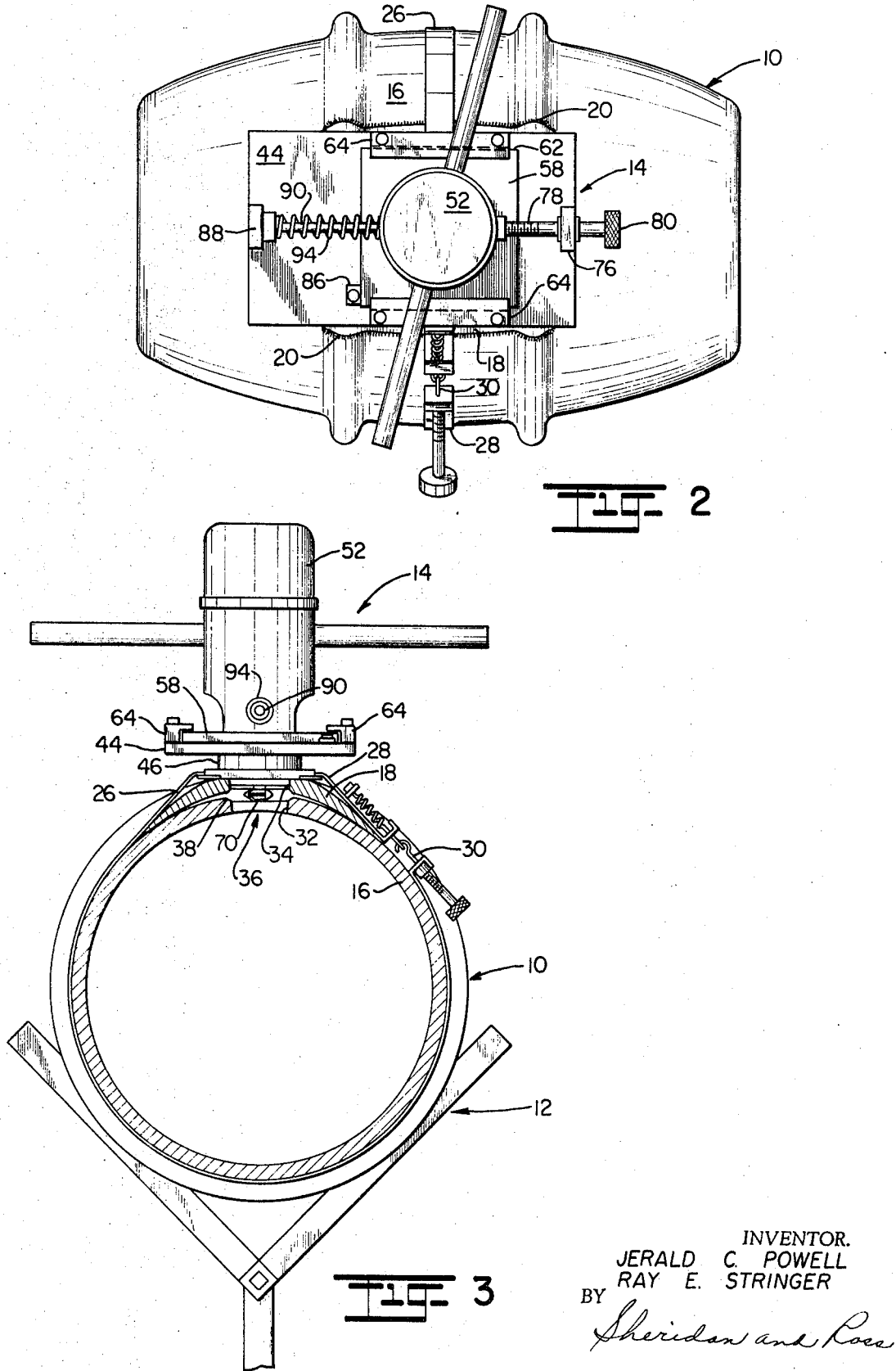

United States Patent Office 3,557,435
Patented Jan. 26, 1971

3,557,435
METHOD FOR REPAIRING BUNGHOLES
Jerald C. Powell and Ray E. Stringer, both of
2945 Larimer St., Denver, Colo. 80205
Filed Sept. 25, 1968, Ser. No. 762,560
Int. Cl. B22d 19/10; B23p 7/00
U.S. Cl. 29—401                                  7 Claims

ABSTRACT OF THE DISCLOSURE

Method of repairing damaged bunghole in container having double walls united around bunghole by weld ring comprises cutting groove in passage wall between container walls to remove most or all of weld ring, cleaning out void between walls and filling groove with new weld metal. If passage wall is scored, can coat entire wall and then ream to proper size. Apparatus comprises support secured to container, motor on support and drive shaft extending into passage, with cutter at inner end in plane of weld ring. Motor displaced laterally and swung in circle for cutter to produce groove around entire periphery and remove old weld ring.

BACKGROUND OF THE INVENTION

This invention lies in the field of container maintenance and rework, especially the repair of damaged passages or bungholes in barrels or other containers. It is directed more particularly to the problems of repairing bungholes passing through double-walled portions of barrels which are united around the bunghole by a weld ring. While the method and apparatus are particularly useful in the repair of barrels used for beer, they are not specifically limited thereto, and may be used wherever they are found to be of advantage.

One type of beer container which has come into very widespread use comprises an aluminum alloy barrel having a bung plate overlying a rather large area of the barrel around the bunghole. The plate is welded to the barrel wall all around its margin but is facewise spaced from the barrel wall throughout substantially its entire area. It is provided with a hole in alignment with the hole in the barrel wall and is united with the wall by a ring of weld material at the openings or holes. The ring thus forms the intermediate portion of the length of a total unitary bunghole which is finally reamed out to an exact predetermined size to receive a standard bung.

The bunghole or passage is subject to damage of various kinds in the course of use. The tools used to remove bungs frequently slip and chip or score the passage wall. Eventually the seal is no longer satisfactory and the wall must be repaired. Barrels are subjected to tremendous shock loads in handling as they are loaded on and dumped from trucks. As a result, the weld rings develop cracks which allow leakage into the void or space between the walls and also from the void into the passage. To overcome this unsanitary condition it is necessary to repair the weld ring in some fashion which will eliminate the leakage.

SUMMARY OF THE INVENTION

The present invention comprises a simple, quick, and totally satisfactory solution to the problem. Generally stated, an apparatus is mounted on a barrel in such fashion that a rotary cutting tool is located within the passage and rotates in a plane lying between the container walls. It is brought into contact with the passage wall and moved around the periphery to cut a complete annular groove which removes most if not all of the original weld ring which has developed a defect. New weld material is then deposited in the groove.

Because of the leakage of beer or other liquid into the void between the plates it is necessary to clean out the void to prevent the presence of contaminating foreign matter on the surfaces where the new weld is to be made. For this purpose, a small hole is drilled in the bung plate and air or other gas under pressure is injected to drive out all of the foreign matter. Detergent or other cleansing material may be added to the air if desired. After the cleaning operation, the access hole is sealed up by welding.

If other portions of the passage wall have been damaged, weld material may be deposited on the entire wall, and the hole is then reamed out to the original standard size.

The apparatus generally comprises a base which is secured to the container, a frame rotatably mounted on the base, and a drive motor mounted on the frame for limited lateral displacement. The motor has a shaft extending through holes in the frame and base and into the passage opening. At its free end a cutting tool is mounted in a plane between the container walls. To cut the annular groove which will remove the old weld metal, the drive motor is displaced laterally on the frame until the rotating tool is in cutting contact with the passage wall. The frame is then rotated about its axis which is coincident with the axis of the passage so that the tool will sweep the entire periphery and cut a groove of uniform depth.

BRIEF DESCRIPTION OF THE DRAWINGS

Various other advantages and features of novelty will become apparent as the description proceeds in conjunction with the accompanying drawings, in which:

FIG. 2 is a top plan view of the container with the apparatus mounted thereon;

FIG. 3 is a sectional view taken on the line 3—3 of FIG. 1;

FIG. 4 is a fragmentary sectional view similar to FIG. 3 to an enlarged scale;

FIG. 5 is a sectional view of a portion of the container with the new weld material in place;

FIG. 6 is a view similar to FIG. 5 with the weld material reamed to size;

FIG. 7 is a side elevational view of a reamer for trimming the weld material; and FIG. 8 is a perspective view of the cutting tool.

DESCRIPTION OF THE PREFERRED EMBODIMENT

Figure 1:
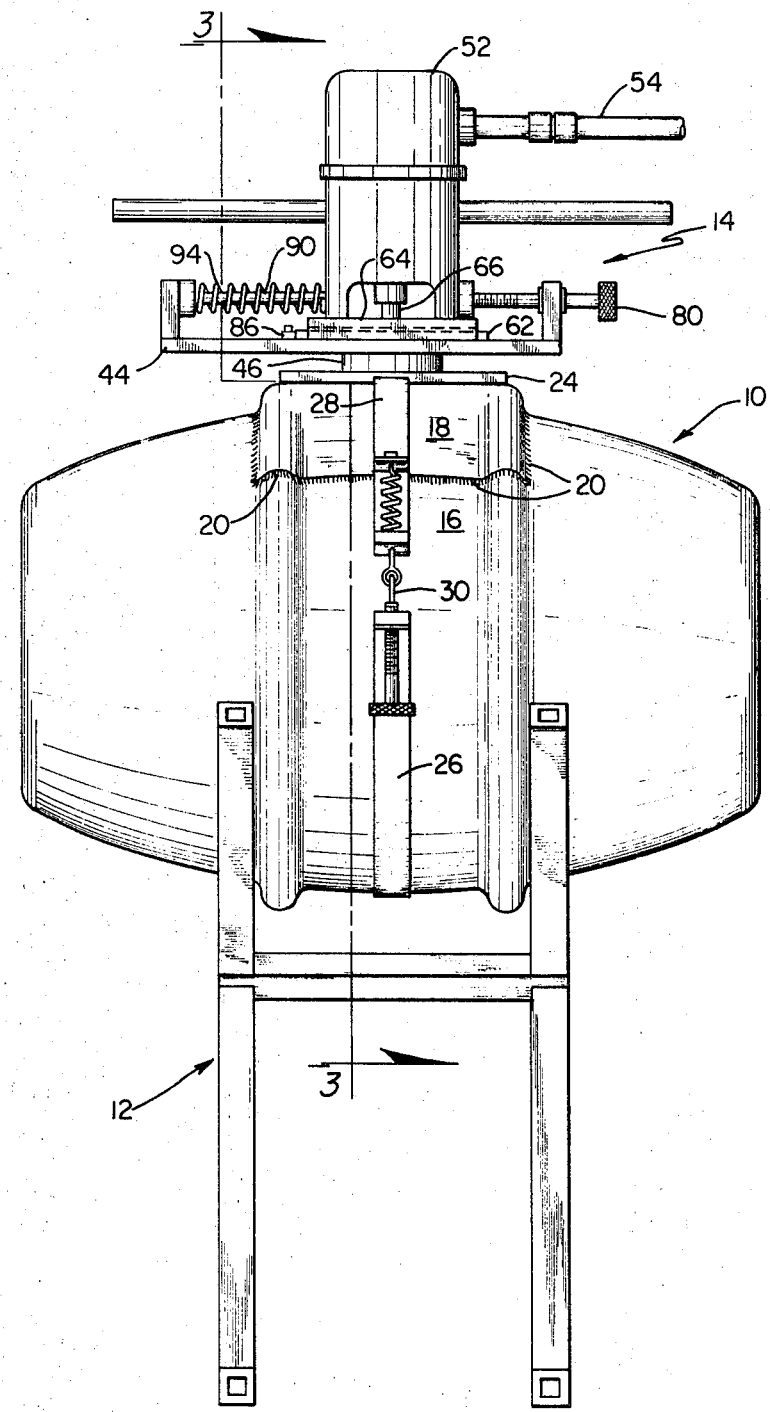
FIG. 1 is a side elevational view of a container mounted on a support and the apparatus of the invention mounted on the container.

A complete assembly ready for a repair operation is illustrated in FIG. 1, in which the container 10, usually of aluminum alloy, is mounted on a support stand 12, and the apparatus 14 is mounted in place on the container. The container includes a main wall portion 16 and a bung plate 18 which is welded thereto along the marginal line 20. As can be seen in FIGS. 3 and 4, the plate or second wall 18 is facewise spaced from wall 16 to form a void or space 22 throughout most of the area of wall 18.

The primary support element of apparatus 14 is a plate-like base 24 which overlies the relatively flat outer surface of wall 18 and is held in place by straps 26 and 28 each attached at one end to wall 18 and encircling the container. The opposite ends of the straps are connected to a turnbuckle 30 which is suitably tightened to hold the base firmly in place. As can be seen best in Fig. 3, there are aligned openings 32 and 34 in walls 16 and 18 which form the inner and outer portions of a bunghole or passage 36. A ring of weld material 38 joins the two walls at their openings and constitutes the intermediate portion of the length of the passage 36.

An opening 40 is formed in base 24 in alignment with passage 36 for access of other elements to be described, and a bearing race 42 surrounds and surmounts opening 40 and is rigidly secured to the base as by welding. A rectangular plate-like frame 44 is arranged above and parallel to the base and is provided with a second bearing race 46. Balls 48 complete an anti-friction bearing to mount frame 44 for rotation on the base about the axis of passage 36 which is substantially perpendicular to the plane of walls 16 and 18. A guide sleeve 50 carried by frame 44 extends from opening 60 of frame 44 through base 24 and into opening 34 in plate 18 to initially center the apparatus with respect to passage 36.

A drive motor 52 is mounted on frame 44 and is supplied with power through conductor 54 from a source not shown. The power may be compressed air or electricity as desired. The lower portion of the motor casing includes legs 56 and a planar end plate 58 integral therewith which fits flat on frame 44 and is slidable thereon in a plane perpendicular to the axis of the motor and of passage 36. It is constrained to travel lengthwise of frame 44 by engagement of its edges 62 with flanges 64 mounted at the sides of frame 44.

Motor 52 is provided with a rotatable drive shaft 66 which extends downwardly through opening 68 in the end plate and the openings in the frame and base into passage 36. Its lower free end 70 has a button or mushroom shape provided with a cross slot in which is mounted a blade-like cutting tool 72 having opposed V-shaped cutting edges 74, as best seen in Fig. 8. It will be noted that the tool is so located that its cutting edges rotate in a plane lying between the inner and outer walls of the container.

When the shaft is generally centered in passage 36 as indicated in solid lines in Figs. 3 and 4 it is apparent that it will not engage the passage wall to perform the cutting operation. It must be bodily displaced laterally parallel to itself to contact the wall. This is accomplished by bodily displacement of drive motor 52 on frame 44. As best seen in Fig. 4, an upstanding boss 76 is provided on one end of frame 44. A threaded adjustment rod 78 having a hand wheel 80 is mounted in the boss for rotation but is restrained against translation. The free end of rod 78 is threaded in nut 82 which is welded to one of the legs 56, wih the end of the rod extending through clearance hole 84. When the rod is rotated in one direction the motor 52 will be moved to the left as viewed in Fig. 4, carrying it off center and bringing tool 72 into contact with the wall of passage 36, where its rotation will begin to cut a groove in the wall.

The frame 44 is then rotated about its axis to cause the tool to sweep the entire periphery of the passage and cut out a groove, removing the original weld material or ring 38 shown in Fig. 3. The tool may be set for an initial light cut with a full circle sweep and then successively set deeper and swung repeatedly, or it may be originally set for a full depth cut and swung full circle sowly. The result is that most or all of the weld ring will be removed as shown in Fig. 4. The maximum depth of cut is controlled by contact of end plate 58 with stop member 86. For general purposes the stop may be adjustable but for the present use it is fixed because all of the passages 36 are the same size.

The normal manufacturing tolerance thread clearances between members 78 and 82 will produce a small amount of lost motion, which however is often sufficient to cause tool chatter. To overcome this problem, a second upstanding boss 88 is provided on the opposite end of frame 44. A guide rod 90 extends from the boss into a clearance hole 92 in leg 56 of the motor casing and a spring 94 surrounds the rod. The spring is under substantial compression between boss 88 and leg 56 so as to yieldingly urge the motor to the right at all times and eliminate thread clearance, thus avoiding tool chatter.

As previously mentioned, there is always a possibility that there will be foreign matter in the void or space 22 between walls 16 and 18 which could move into the weld zone and cause a defective weld. This problem is overcome by forming an access opening 96 in wall 18 through which compressed air is injected to drive out foreign matter. Detergent or other cleansing material may be mixed with the air if desired. In some cases it is desirable to provide a second air exit opening 98, particularly if the grooving operation does not remove all of the original weld ring. After the cleanout operation is completed, the air openings are sealed with weld metal.

The next step in the method is to deposit the necessary amount of weld metal in the groove which has been formed by the cutting tool and, if necessary, to deposit weld metal on the remainder of the wall of passage 36. This suituation is illustrated in FIG. 5, with the additional weld metal being designated 100. In some cases it may be necessary or desirable to first ream out the passage oversize so that the new material will have a substantial thickness in the finished article.

After the welding is completed, the hole must be brought to standard size and shape. For this purpose, the reamer 102 of FIG. 7 may be used to produce the result shown in FIG. 6. The shank 104 carries a diametrical reamer 106 which cuts out sufficient weld metal 100 to bring passage 36 back to the original standard size and shape. If desired, the shank may also carry a face reamer 108 to remove the excess material at the outer edge of passage 36. In some cases the bungs require a flat outer edge, and in any event it is desirable for installation of the repair apparatus.

It will be apparent to those skilled in the art that various changes may be made in the method and apparatus disclosed without departing from the spirit of the invention and it is intended that all such changes shall be embraced within the scope of the following claims.

We claim:

1. A method of repairing the wall of a passage extending substantially perpendicularly through a double-walled portion of a container, the walls of the container being spaced from each other in the direction of the axis of the passage and being united by a ring of defective bonding material forming an intermediate portion of the passage wall, comprising: cutting a peripheral groove in the passage wall in a plane lying between the container walls to remove at least the major portion of the bonding material; and filling the groove with solid material forming a liquid-impervious bond between the container walls and constituting a new intermediate portion of the passage wall.

2. A method as claimed in claim 1; further including overfilling said groove with solid material extending into said passage; and removing the excess portion of said material to cause it to conform to the remainder of the passage wall.

3. A method as claimed in claim 2; further including depositing solid material on the remainder of the passage wall; and removing excess material from the entire length of the passage wall to cause it to conform to a predetermined size and shape.

4. A method as claimed in claim 3; further including an initial step of removing material from the entire length of the passage wall to eliminate damaged areas of the wall and to enlarge the passage to accommodate a substantial thickness of new material in the finished article.

5. A method as claimed in claim 1; including the step of injecting pressurized cleansing fluid between the container walls to drive out contaminating foreign matter afer cutting the groove and before filling the groove.

6. A method as claimed in claim 5; further including the step of forming an access opening through the outer wall of the container for the injection of the cleansing fluid; and hermetically sealing said opening after the cleansing operation to seal off the space between the container walls.

7. A method as claimed in claim 1; in which the container is formed of metallic material and the solid filling material is the same metallic material; and the filling operation is performed by welding.

(Other references on following page)

References Cited

UNITED STATES PATENTS

| | | | |
|---|---|---|---|
| 1,857,912 | 5/1932 | Jones | 29—401X |
| 2,216,033 | 9/1940 | Hopkins | 220—63X |
| 2,445,273 | 7/1948 | Kennedy | 138—97 |
| 3,427,726 | 2/1969 | Fleissner | 29—401X |
| 3,487,530 | 1/1970 | Ely | 52—514X |

JOHN F. CAMPBELL, Primary Examiner

V. A. DIPALMA, Assistant Examiner

U.S. Cl. X.R.

138—97